(12) United States Patent
Kaneda et al.

(10) Patent No.: US 10,553,870 B2
(45) Date of Patent: Feb. 4, 2020

(54) NICKEL MANGANESE CONTAINING COMPOSITE HYDROXIDE AND MANUFACTURING METHOD FOR PRODUCING SAME

(71) Applicant: SUMITOMO METAL MINING CO., LTD., Tokyo (JP)

(72) Inventors: Haruki Kaneda, Niihama (JP); Takaaki Ando, Niihama (JP); Ryozo Ushio, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/764,453

(22) PCT Filed: Sep. 27, 2016

(86) PCT No.: PCT/JP2016/078344
§ 371 (c)(1),
(2) Date: Mar. 29, 2018

(87) PCT Pub. No.: WO2017/057311
PCT Pub. Date: Apr. 6, 2017

(65) Prior Publication Data
US 2018/0316006 A1    Nov. 1, 2018

(30) Foreign Application Priority Data

Sep. 30, 2015    (JP) .................................. 2015-193650

(51) Int. Cl.
*H01M 4/00* (2006.01)
*H01B 1/06* (2006.01)
(Continued)

(52) U.S. Cl.
CPC ............ *H01M 4/525* (2013.01); *C01G 53/00* (2013.01); *C01G 53/40* (2013.01); *C01G 53/50* (2013.01);
(Continued)

(58) Field of Classification Search
CPC ............. H01M 4/525; H01M 10/0525; H01M 2004/028; H01M 4/505; C01G 53/00;
(Continued)

(56) References Cited

U.S. PATENT DOCUMENTS

| 10,020,507 B2 | 7/2018 | Kobayashi et al. |
| 2014/0106228 A1* | 4/2014 | Toya ............ C01G 53/006 429/223 |
| 2015/0093580 A1 | 4/2015 | Kobayashi et al. |

FOREIGN PATENT DOCUMENTS

| JP | 2003-051311 A | 2/2003 |
| JP | 2003-086182 A | 3/2003 |

(Continued)

OTHER PUBLICATIONS

International Search Report dated Nov. 1, 2016, issued for PCT/JP2016/078344.
(Continued)

*Primary Examiner* — Mark Kopec
(74) *Attorney, Agent, or Firm* — Locke Lord LLP; James E. Armstrong, IV; Nicholas J. DiCeglie, Jr.

(57) ABSTRACT

The present invention industrially provides: a non-aqueous electrolyte secondary battery having a high energy density and high cycling characteristics; a cathode active material for a non-aqueous electrolyte secondary battery having a high packing efficiency; and a nickel manganese containing composite hydroxide having a small particle size, a narrow particle size distribution, and a high sphericity. When producing the nickel manganese containing composite hydrox-
(Continued)

ide by a crystallization reaction using material solution where metal compounds including nickel and manganese dissolve, a nucleation process is performed in a non-oxidizing atmosphere by stirring an aqueous solution for nucleation, that includes the quantity of the material solution corresponding to 0.6% to 5.0% of the whole amount of substance of metal element included in a metal compound used for the overall crystallization reaction.

9 Claims, 2 Drawing Sheets

(51) Int. Cl.
*H01M 4/525* (2010.01)
*H01M 4/505* (2010.01)
*C01G 53/00* (2006.01)
*H01M 10/0525* (2010.01)
*H01M 4/02* (2006.01)

(52) U.S. Cl.
CPC .............. *H01B 1/06* (2013.01); *H01M 4/505* (2013.01); *H01M 10/0525* (2013.01); *C01P 2002/22* (2013.01); *C01P 2004/32* (2013.01); *C01P 2004/50* (2013.01); *C01P 2004/51* (2013.01); *C01P 2004/61* (2013.01); *C01P 2006/11* (2013.01); *C01P 2006/40* (2013.01); *H01M 2004/028* (2013.01)

(58) Field of Classification Search
CPC ..... C01G 53/40; C01G 53/50; C01P 2002/22; H01B 1/00; H01B 1/06; H01B 1/08
USPC ......................................................... 252/500
See application file for complete search history.

(56) References Cited

FOREIGN PATENT DOCUMENTS

| JP | 2003-151546 A | 5/2003 |
| JP | 2004-210560 A | 7/2004 |
| JP | 2008-147068 A | 6/2008 |
| WO | 2012/169274 A1 | 12/2012 |
| WO | 2014/061399 A1 | 4/2014 |

OTHER PUBLICATIONS

Search Report dated Dec. 11, 2018, issued for the European patent application No. 16851482.6.
Office Action dated Apr. 16, 2019, issued for the counterpart Japanese Patent Application No. 2015-193650 and English translation thereof.

* cited by examiner

NICKEL MANGANESE CONTAINING COMPOSITE HYDROXIDE AND MANUFACTURING METHOD FOR PRODUCING SAME

TECHNICAL FIELD

The present invention relates to a nickel manganese containing composite hydroxide that is used as a precursor of a cathode active material for non-aqueous electrolyte secondary battery and the manufacturing method for producing same, and a cathode active material for non-aqueous electrolyte secondary battery and the manufacturing method for producing same, and further relates to a non-aqueous electrolyte secondary battery.

BACKGROUND ART

In recent years, with the spread of portable electronic devices such as cell phones, notebook personal computers and the like, there is a large need for development of compact and lightweight secondary batteries having a high energy density. Lithium ion secondary batteries exist as such secondary batteries. Lithium transition metal composite oxide and the like are used as cathode materials of the lithium ion secondary battery which is a non-aqueous electrolyte secondary battery, and lithium metal, lithium alloy, metal oxide, carbon material and the like are used as anode material. These materials are the materials where lithium can be desorbed and adsorbed.

Currently, much research and development is being performed for such lithium-ion secondary batteries. Among these, lithium ion batteries using lithium transitional metal containing composite oxide, especially lithium ion secondary battery using lithium cobalt composite oxide ($LiCoO_2$), for which the composition is comparatively simple, as the cathode material can obtain a 4V class high voltage, so it is being practically used as a battery having a high energy density. Currently, development of lithium nickel composite oxide ($LiNiO_2$) that uses nickel that is less expensive than cobalt, lithium nickel cobalt manganese composite oxide ($LiNi_{0.33}Co_{0.33}Mn_{0.33}O_2$), lithium nickel manganese containing composite oxide including at least nickel and manganese and the like, have been advanced.

Among these, lithium nickel manganese containing composite oxide is relatively less expensive and well balanced in thermal stability and durability and so on, so it catches an attention as a cathode active material. However, the discharging capacity is inferior to that of lithium nickel composite oxide, so lithium nickel manganese containing composite oxide is needed to improve its discharging capacity and packing efficiency in order to improve the energy density. Further, it is also required to have excellent cycling characteristics.

In order to obtain a high energy density and high cycling characteristics, it is effective to make a cathode active material to have a small particle size and a narrow particle size distribution. When a cathode active material having a wide particle size distribution is used, due to the ununiformity of a voltage applied to a particle within an electrode, fine particles selectively deteriorate by repeated charging and discharging, and the discharging capacity lowers. Furthermore, due to the faster deterioration of the discharging capacity, the cycling characteristics become lower.

Generally, a cathode active material of lithium nickel manganese containing composite oxide is manufactured as nickel manganese containing composite hydroxide being its precursor, in order to make a cathode active material being composed of particles having a small particle size and a narrow particle size distribution, it is required to make the nickel manganese containing composite hydroxide that is to be a precursor being composed of particles having a small particle size and a narrow particle size distribution as well.

For example, JP2004-210560 discloses a manganese nickel composite hydroxide that has a substantial manganese-nickel content ratio of 1:1, an average particle size within the range of 5 μm to 15 μm, a tap density within the range of 0.6 g/ml to 1.4 g/ml, a bulk density within the range of 0.4 g/ml to 1.0 g/ml, a specific surface area within the range of 20 $g/m^2$ to 55 $g/m^2$, a sulfate radical content within the range of 0.25% by mass to 0.45% by mass, and the ratio ($I_0/I_1$) of the maximum intensity at the peak of X-ray diffraction ($I_0$) within the range of 15≤2θ≤25 and the maximum intensity ($I_1$) within the range of 30≤2θ≤40 of 1 to 6. Further, the surface and internal structure of the secondary particle is netlike due to the pleated wall of the primary particles, and it is said that the space surrounded by the pleated wall is relatively large.

JP2004-210560 further discloses a coprecipitation of particles being produced by reacting a mixed aqueous solution of manganese salt and nickel salt in which the atomic ratio of manganese and nickel is substantially 1:1 with an alkaline solution in a complexing-agent-added aqueous solution having a pH of 9 to 13 under a suitable stirring condition while the oxidation of manganese ion is controlled within a certain range.

However, although JP2004-210560 considers the particle structure of a lithium manganese nickel composite hydroxide, as it is apparent from the disclosed pictures of electron microscope, the obtained particles include large and fine particles and the homogenization of its particle size is not considered.

On the other hand, regarding the particle size distribution of lithium transition metal composite oxide, for example, JP2008-147068 discloses a lithium transition metal composite oxide in which an average particle size D50 meaning the particle size at a cumulative frequency of 50% is within the range of 3 μm to 15 μm, minimum particle size is more than 0.5 μm, maximum particle size is less than 50 μm, and, in a relation of D10 and D90 meaning the particle size at the cumulative frequency of 10% and 90%, D10/D50 is within the range of 0.60 to 0.90, and D10/D90 is within the range of 0.30 to 0.70. This lithium transition metal composite oxide has a high packing efficiency, excellent charge and discharge characteristics and output characteristics, and it is difficult to deteriorate even under a condition with large charge and discharge loads, so when this lithium transition metal composite oxide is used as a cathode material, a non-aqueous electrolyte secondary battery having excellent output characteristics and with little deterioration of cycling characteristics may be obtained.

However, the lithium transition metal composite oxides being disclosed in JP2008-147068 includes fine particles and large particles as the minimum particle size is more than 0.5 μm and the maximum particle size is less than 50 μm with respect to the average particle size of 3 μm to 15 μm. Further, regarding the particle size distribution being defined by D10/D50 and D10/D90, the particle size distribution of the lithium transition metal composite oxide is not narrow. Therefore, even if a cathode active material having an insufficient uniformity of particle size like this is used, it is difficult to sufficiently improve the electrical characteristics of a non-aqueous electrolyte secondary battery.

Further, in order to improve the particle size distribution, many suggestions have been proposed regarding the manufacturing method of a transition metal composite hydroxide as a precursor of a cathode active material. For example, JP2003-086182 proposes a method for obtaining a precursor which is a transition metal composite hydroxide or a transition metal composite oxide, by putting an aqueous solution that includes more than two kinds of the transition metal salt or by putting more than two kinds of aqueous solution of different transition metal salt simultaneously with alkaline solution into a reaction tank, and by coprecipitating them while a reducing agent is made to coexist or while ventilating inert gas.

However, as this technology collect produced crystals while classifying, it would be needed to strictly manage the manufacturing condition in order to obtain products having a uniform particle size. Therefore, the production on an industrial scale which employs this technology is difficult. Further, with this technology, although it is possible to obtain crystal particles having a large particle size, it is difficult to obtain crystal particles having a small particle size.

Further, WO2012/169274 discloses a cathode active material that has: a layered hexagonal lithium nickel composite oxide; an average particle size within the range of 8 μm to 16 μm; and an index of [(D90-D10)/average particle size], which indicates the spread of the particle size distribution, less than 0.60. As such a manufacturing method, it has been proposed to perform nucleation while controlling the pH to be 12.0 to 14.0 at a solution temperature of 25° C. as a standard, then the produced particles are grown by controlling the aqueous solution for particle growth which includes the formed nuclei to have a pH of 10.5 to 12.0 at a solution temperature of 25° C. as a standard as well as by controlling the pH to be lower than that of at the nucleation process, while controlling the stirring power requirement per unit volume at least at the nucleation process to be 0.5 kW/m$^3$ to 4.0 kW/m$^3$. This technology somewhat improves the packing efficiency and output characteristics by homogenizing the particle size distribution, but further improvements should be made regarding the packing efficiency.

On the other hand, JP2003-151546 proposes a cathode active material being composed of hexagonal post shaped particles in order to improve the packing efficiency by focusing on the particle properties of a cathode active material. Although this cathode active material shows an excellent packing efficiency, it is not suitable for industrial manufacture as it requires performing sintering and powdering more than twice. Further, square and plate shaped particles are needed to be grown in a way that its crystal surface is grown specifically in order to obtain desired electrical characteristics, and there is a disadvantage as the quality is not stable. Furthermore, when applying cathode material to produce the electrode, it is very difficult to apply it to make its crystalline orientation suitable. Therefore, in order to achieve a high densification due to a high crystalline orientation, a special application process is required so that the manufacturing cost will be expensive, which is a problem.

Further, JP2003-051311 proposes to separate particles having large particle size and particles having small particle size and adjust the mixing ratio of these particles to suitably mix particles having different particle sizes to have an overall high packing efficiency to obtain a cathode active material that has both excellent rate characteristics and discharging capacity. However, as this technology requires producing two kinds of particles that have different particle sizes, there is a problem that the manufacturing cost becomes high and small particles having small particle size selectively deteriorate.

[Patent Literature]

| [Patent Literature 1] | JP2004-210560 |
| [Patent Literature 2] | JP2008-147068 |
| [Patent Literature 3] | JP2003-086182 |
| [Patent Literature 4] | WO2012/169274 |
| [Patent Literature 5] | JP2003-151546 |
| [Patent Literature 6] | JP2003-051311 |

SUMMARY OF INVENTION

Problem to be Solved by Invention

As explained above, a cathode active material and its precursor that are able to sufficiently improve the performance of a non-aqueous electrolyte secondary battery, and furthermore a technology for producing them on an industrial scale have not been developed at this point.

Taking the problems above into consideration, the object of the present invention is to provide: a non-aqueous electrolyte secondary battery having a high energy density and high cycling characteristics; a cathode active material for non-aqueous electrolyte secondary battery having a high packing efficiency that realizes a non-aqueous electrolyte secondary battery having such electrical characteristics; and a nickel manganese containing composite hydroxide having a small particle size, narrow particle size distribution, and high sphericity, by an industrial manufacturing process.

Means for Solving Problems

The nickel manganese containing composite hydroxide of the present invention is characterized in: represented by a general formula of $Ni_xMn_yM_z(OH)_2$ ($x+y+z=1$, $0.1 \leq x \leq 0.7$, $0.1 \leq y \leq 0.5$, $0.1 \leq z \leq 0.5$; and M is at least one element that is selected from among Co, Ti, V, Cr, Zr, Nb, Mo, Hf, Ta, and W); comprising secondary particles that are formed by an aggregation of primary particles; and in which a median diameter D50 of the secondary particle is within the range of 1 μm to 6 μm; an index of [(D90-D10)/D50], which indicates the spread of the particle size distribution of the secondary particles, is less than 0.50; and the tap density according to JIS2512:2012 is within the range of 1.60 g/cm$^3$ to (0.04D50+1.60) g/cm$^3$.

The Wadell's sphericity of the nickel manganese containing composite hydroxide is preferably within the range of 0.70 to 0.98.

The manufacturing method of nickel manganese containing composite hydroxide of the present invention uses a material solution in which metal compound that includes at least nickel and manganese is dissolved to manufacture nickel manganese containing composite hydroxide that is represented by the general formula of $Ni_xMn_yM_z(OH)_2$ ($x+y+z=1$, $0.1 \leq x \leq 0.7$, $0.1 \leq y \leq 0.5$, $0.1 \leq z \leq 0.5$; M is one or more of element that is selected from among Co, Ti, V, Cr, Zr, Nb, Mo, Hf, Ta, and W) by a crystallization reaction, comprises:

a nucleation process performed in a non-oxidizing atmosphere having an oxygen concentration of 5% by volume or less by stirring an aqueous solution for nucleation that includes the quantity of the material solution corresponding to 0.6% to 5.0% of the whole amount of substance of metal element included in the metal compound used for the overall crystallization reaction, while the aqueous solution are adjusted such that an ammonium ion concentration is within the range of 3 g/l to 25 g/l, and a pH value is within range of 12.0 to 14.0 at a solution temperature of 25° C. as a standard, with a stirring power requirement within the range of 6.0 kW/m³ to 30 kW/m³, to generate nuclei, and a particle growth process where an aqueous solution for particle growth including the nuclei is adjusted such that an ammonium ion concentration is within the range of 3 g/L to 25 g/L and a pH value is within the range of 10.5 to 12.0 at a solution temperature of 25° C. as a standard and the material solution is supplied, to grow the nuclei.

The cathode active material for a non-aqueous electrolyte secondary battery of the present invention is characterized in: comprising a layered hexagonal lithium nickel manganese containing composite oxide: the lithium nickel manganese containing composite oxide being represented by the general formula of $Li_aNi_xMn_yM_zO_2$ (0.95≤a≤1.15, x+y+z=1, 0.1≤x≤0.7, 0.1≤y≤0.5, 0.1≤z≤0.5; M is one or more of element that is selected from among Co, Ti, V, Cr, Zr, Nb, Mo, Hf, Ta, and W), and comprising secondary particles that are formed by an aggregation of primary particles, and in which a median diameter D50 of the secondary particle is within the range of 1 μm to 6 μm, an index of [(D90−D10)/D50], which indicates the spread of the particle size distribution of the secondary particles, is less than 0.50, and the tap density according to JIS2512:2012 is within the range of 1.89 g/cm³ to (0.09×D50+1.80) g/cm³.

It is preferable that the Wadell's sphericity of the cathode active material is within the range of 0.60 to 0.98.

The manufacturing method of the cathode active material for a non-aqueous electrolyte secondary battery of the present invention comprising a layered hexagonal lithium nickel manganese containing composite oxide represented by the general formula: $Li_aNi_xMn_yM_zO_2$ (0.95≤a≤1.15, x+y+z=1, 0.1≤x≤0.7, 0.1≤y≤0.5, 0.1≤z≤0.5; M is one or more of element that is selected from among Co, Ti, V, Cr, Zr, Nb, Mo, Hf, Ta, and W), and comprising secondary particles that are formed by an aggregation of primary particles, comprises:

a mixing process to obtain a lithium mixture by mixing lithium compound to the nickel manganese containing composite hydroxide to have the ratio of the number of lithium atoms against the number of metal element other than lithium within the range of 0.95 to 1.15, and a firing process to sinter the lithium mixture in an oxidizing atmosphere within the temperature range of 750° C. to 1000° C.

The non-aqueous electrolyte secondary battery of the present invention is characterized in using the cathode active material for a non-aqueous electrolyte secondary battery as a cathode material.

Effect of Invention

The present invention provides a nickel manganese containing composite hydroxide having a small particle size and a narrow particle size distribution and a high sphericity, and a cathode active material for a non-aqueous electrolyte secondary battery having a high packing efficiency and succeeding to the particle properties of the aforementioned nickel manganese containing composite hydroxide. By using the cathode active material for a non-aqueous electrolyte secondary battery of the present invention as a cathode material, a non-aqueous electrolyte secondary battery having a high energy density and high cycling characteristics is provided.

Further, the present invention enables to easily provide a nickel manganese containing composite hydroxide and a cathode active material by performing production on an industrial scale, so the industrial value of the present invention is extremely high.

MODES FOR CARRYING OUT INVENTION

Figure 1:
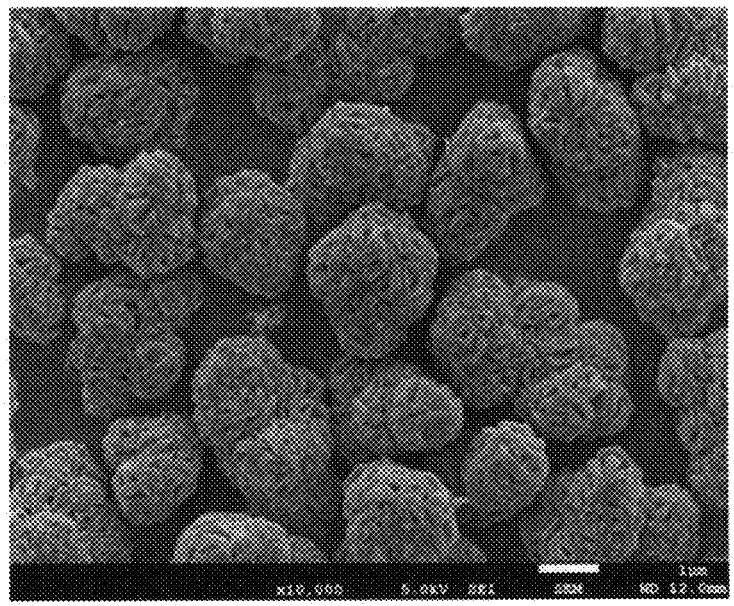
FIG. 1 is a SEM image of the nickel manganese containing composite hydroxide of the present invention.

The inventors of the present invention, in order to solve the problems above, diligently performed research of powder characteristic of a cathode active material for a non-aqueous electrolyte secondary battery by focusing on the sphericity and packing efficiency of a particle, and found that a cathode active material having a high packing efficiency can be obtained by comprising a small particle size, particular particle size range and tap density, and a high sphericity. As a result, it was found that by using this cathode active material as a cathode material, a non-aqueous electrolyte secondary battery having a high energy density and high cycling characteristics can be obtained.

Further, the nickel manganese containing composite hydroxide of the present invention that becomes a precursor of the cathode active material of the present invention has an excellent powder characteristic as that of the cathode active material of the present invention. As a result, it was found that in order to manufacture this kind of nickel manganese containing composite hydroxide of the present invention which has excellent powder characteristics, it is required to separate the nucleation process and particle growth process, and to make the ratio of the material solution being supplied at the nucleation process to be a particular ratio against the whole material solution, and to control the stirring power that stir the aqueous solution for nucleation during the nucleation process.

The present invention was achieved based on these findings. The present invention is divided into: (1) nickel manganese containing composite hydroxide that becomes a precursor of a cathode active material for a non-aqueous electrolyte secondary battery and manufacturing method thereof, (2) a cathode active material for a non-aqueous electrolyte secondary battery and manufacturing method thereof, and (3) a non-aqueous electrolyte secondary battery.

The characteristics of a non-aqueous electrolyte secondary battery are largely affected by the material characteristics of a cathode active material for a non-aqueous electrolyte secondary battery employed as a cathode material. In order to obtain a cathode active material for a non-aqueous electrolyte secondary battery that represents excellent electrical characteristics, it is preferable to use a cathode active material where the particle structure, particle size, and particle size distribution are set in a certain condition and within a range. In order to obtain this kind of cathode active material, it is required to have its precursor nickel manganese containing composite hydroxide to have certain particle structure, particle size, and particle size distribution.

The following is detailed explanations of the present inventions (1) through (3). First, the biggest characteristic of the present invention, nickel manganese containing composite hydroxide and manufacturing method thereof, will be explained.

[1-1] Nickel Manganese Containing Composite Hydroxide

The nickel manganese containing composite hydroxide of the present invention is represented by a general formula of $Ni_xMn_yM_z(OH)_2$ (x+y+z=1, 0.1≤x≤0.7, 0.1≤y≤0.5, 0.1≤z≤0.5; M is one or more of element that is selected from among Co, Ti, V, Cr, Zr, Nb, Mo, Hf, Ta, and W), and comprises a plurality of plate shaped or needle shaped secondary particles that are formed by an aggregation of primary particles. The secondary particles have the median diameter D50 within the range of 1 μm to 6 μm, and an index of [(D90−D10)/D50], which indicates the spread of the particle size distribution, of 0.50 or less.

[Particle Structure]

The nickel manganese containing composite hydroxide of the present invention, as shown in FIG. 1, is constituted by secondary particles that are formed by an aggregation of a plurality of the plate shaped primary particles, in particular, it is preferable to be approximately spherical with the Wadell's sphericity $\Psi_W$ of within the range of 0.70 to 0.98. The Wadell's sphericity $\Psi_W$ is, when the area equivalent diameter is D1 and the circumscribed circle diameter is D2, defined as $\Psi_W=D1/D2$, and the more this value becomes closer to 1, the more the particle becomes closer to spherical. In the present invention, as the precursor nickel manganese containing composite hydroxide has a high Wadell's sphericity $\Psi_W$, particles become tightened during the firing process, it is possible to obtain a cathode active material having a high sphericity.

Moreover, when the plate shaped primary particles randomly aggregated to form secondary particles, they become even preferable particle structure. Because the plate shaped primary particles aggregate in random directions, spaces are uniformly provided between the primary particles, so when firing them with lithium compound, it becomes easier for the melted lithium compound to enter inside the secondary particles, so diffusion of lithium can be performed sufficiently.

Furthermore, because the primary particles aggregate in random directions, contraction of the secondary particles during the firing process occurs equally inside and on the surface of the secondary particles, it is possible to form a large enough space inside the cathode active material, which is preferable.

To measure the Wadell's sphericity $\Psi_W$, a laser diffraction scattering type particle size measuring device with image analysis or a scanning electron microscope image can be used. It can be obtained by observing dozens to several hundreds of particles as samples, calculating their Wadell's sphericity $\Psi_W$, and obtaining their average value.

The Wadell's sphericity $\Psi_W$ of the nickel manganese containing composite hydroxide of the present invention is preferably within the range of 0.70 to 0.98, and more preferably within the range of 0.70 to 0.95. When this value is lower than 0.70, the packing efficiency of the obtained cathode active material tends to lower, and when this value is over 0.98, there tends to be spaces between the secondary particles forming the cathode active material when packing.

[Median Diameter D50]

The median diameter D50 of the nickel manganese containing composite hydroxide of the present invention is preferably within the range of 1 μm to 6 μm, more preferably within the range of 2 μm to 5.5 μm. The median diameter D50 means the particle size at the cumulative distribution of 50 volume % when the number of particles is cumulated from smaller ones. By adjusting the median diameter of the nickel manganese containing composite hydroxide which is a precursor of the cathode active material, D50 of the cathode active material can be within the range of 1 μm to 6 μm. As there is a correlation between the particle size distribution of the precursor and the particle size of the cathode active material obtained by using it, a precursor of a preferable particle size distribution needs to be obtained in order to obtain desired electrical characteristics.

When D50 of the precursor nickel manganese containing composite hydroxide is less than 1 μm, D50 of the cathode active material also becomes small. As a result, the packing density of the cathode active material in a secondary battery lowers and the battery capacity per volume lowers. On the other hand, when D50 of the nickel manganese containing composite hydroxide is more than 6 μm, the specific surface area of the cathode active material lowers. As a result, the interface with the electrolyte decreases and the resistance of the cathode of a secondary battery heightens, so that its output characteristics and cycling characteristics lower.

[Particle Size Distribution]

Regarding the particle size distribution of the nickel manganese containing composite hydroxide of the present invention, the index of [(D90−D10)/D50], which indicates the spread of the particle size distribution, is adjusted to become less than 0.50, preferably less than 0.46. As stated above, there is a correlation between the particle size distribution of a precursor and the particle size distribution of a cathode active material using it, when the particle size distribution of the nickel manganese containing composite hydroxide is wide, that is, when [(D90−D10)/D50] is greater than 0.50, the particle size distribution of the obtained cathode active material also becomes wide. As a result, there exist mixtures of fine particles and large particles in the cathode active material and it is not preferable for characteristics of a second battery.

In particular, when the cathode is formed by using a cathode active material having many fine particles, there might be a possibility to generate heat due to a local reaction of fine particles. As a result, the safety of the battery lowers, and the cycling characteristics of the secondary battery deteriorates as the fine particles selectively degrade. On the other hand, when the cathode is formed by using a cathode active material having many large particles, the reaction area between the electrolyte and cathode active material becomes small, and the output of a secondary battery lowers due to the increase of reaction resistance.

Therefore, in the nickel manganese containing composite hydroxide of the present invention, by adjusting an index of [(D90−D10)/D50], which indicates the spread of the particle size distribution to become less than 0.50, [(D90−D10)/D50] of the particle size distribution of the cathode active material being obtained by using this as a precursor also becomes less than 0.50 so that the particle size can be uniformed.

By using a cathode active material being formed as a precursor of such a nickel manganese containing composite hydroxide of the present invention as the cathode material of a secondary battery, it becomes possible to achieve both high energy density and good cycling characteristics in a secondary battery.

The smaller the index is, it is possible to narrow the particle size distribution of a cathode active material, but the realistic lower limit is about 0.1.

Regarding the [(D90−D10)/D50] which indicates the spread of a particle size distribution, D10 means the particle size at the cumulative frequency of 10% when the number of particles is cumulated from smaller ones, and D90 is the particle size at the cumulative frequency of 90% when the number of particles is cumulated from smaller ones. In this invention, the method to obtain D50, D90, and D10 is not particularly limited, but it can be obtained from the volume integrated value measured with a laser diffraction scattering type particle size measuring device.

[Particle Composition]

The composition of the nickel manganese containing composite hydroxide of the present invention is represented by a general formula: $Ni_xMn_yM_z(OH)_2$ ($x+y+z=1$, $0.1 \leq x \leq 0.7$, $0.1 \leq y \leq 0.5$, $0.1 \leq z \leq 0.5$; M is one or more of element that is selected from among Co, Ti, V, Cr, Zr, Nb, Mo, Hf, Ta, and W). By using the cathode active material made as a precursor of nickel manganese containing composite hydroxide having such a composition as the cathode material, it is possible to obtain a secondary battery having high capacity and excellent cycling characteristics.

This composition ratio (x:y:z) of the nickel manganese containing composite hydroxide is maintained after the firing process. Therefore, the composition ratio of the nickel manganese containing composite hydroxide of the present invention is adjusted to be the same composition ratio as required for the cathode active material to be obtained eventually.

(1-2) Manufacturing Method of Nickel Manganese Containing Composite Hydroxide

The manufacturing method of composite hydroxide of the present invention uses a material solution where metal compound that includes at least nickel and manganese are dissolved and manufactures nickel manganese containing composite hydroxide by crystallization reaction. The manufacturing method comprises: (a) nucleation process that performs nucleation; and (b) particle growth process where the nuclei formed during the nucleation process are grown.

That is, in the conventional continuous crystallization method, the nucleation reaction and particle growth reaction proceed simultaneously in the same tank, the particle size distribution of the obtained composite hydroxide becomes wide. On the other hand, in the manufacturing method of composite hydroxide of the present invention, it is characterized in achieving a narrow particle size distribution for the obtained composite hydroxide by clearly separating the process where nucleation reaction mainly takes place (nucleation process) and the process where particle growth reaction mainly takes place (particle growth process). Moreover, it is characterized in obtaining a composite hydroxide having small particle size and high tap density by controlling the ratio of the volume of the material solutions used for the nucleation process and particle growth process. Furthermore, it is characterized in making the particle structure of the obtained nickel manganese containing composite hydroxide dense by controlling the atmosphere during the crystallization reaction.

(a) Nucleation Process

First, by dissolving a plurality of metal compound that includes at least nickel compound and manganese compound in water at a particular ratio, a material solution is produced. In the manufacturing method of nickel manganese containing composite hydroxide of the present invention, except for the added metal element that to be coated on the surface in a later process, the composition of the obtained nickel manganese containing composite hydroxide becomes substantially the same as the composition of the material solution.

Therefore, the material solution is produced by adjusting the ratio of the metal compound to be dissolved in water such that the ratio of the amount of substance of each metal element in the material solution becomes the same as the ratio of each metal composition in the nickel manganese containing composite hydroxide of the present invention.

On the other hand, in the reaction tank, pre-reaction aqueous solution is prepared by supplying and mixing alkali aqueous solution such as sodium hydroxide aqueous solution which is a pH conditioner, ammonia aqueous solution which is ammonium ion supplier, and water. Regarding the pH of this pre-reaction aqueous solution, by adjusting the supplied amount of alkali aqueous solution, it is preferable to adjust the pH at the solution temperature of 25° C. as a standard to be within the range of 12.0 to 14.0, preferably to be within the range of 12.3 to 13.5, and more preferably to be within the range of 12.5 to 13.5.

Further, the concentration of ammonium ion in the pre-reaction aqueous solution is adjusted to be within the range of 3 g/L to 25 g/L, preferably within the range of 5 g/L to 20 g/L, by adjusting the supplied amount of ammonia aqueous solution.

Regarding the temperature of the pre-reaction aqueous solution, it is adjusted preferable to be more than 20° C., more preferably within the range of 30° C. to 60° C. The pH and the concentration of ammonium ion of the aqueous solution in the reaction tank be respectively measured with common pH meter and ion meter.

The atmosphere in the reaction tank is set to be non-oxygen atmosphere. The reaction atmosphere is controlled by flowing inert gas into the reaction tank and making the oxygen concentration less than 5 volume %, preferably less than 2 volume % to be non-oxygen atmosphere. When the oxygen concentration becomes higher than 5 volume %, generated nuclei become sparse, so the particle density lowers and the particle density of the cathode active material lowers. Further, as nuclei having a low sphericity are generated, even when a particle growth process is performed later, particles having a high sphericity cannot be obtained and the packing efficiency lowers.

After the temperature, pH, and ammonium ion concentration of the pre-reaction aqueous solution is adjusted in the reaction tank, the material solution is supplied in the reaction tank while the pre-reaction aqueous solution is stirred. By doing this, in the reaction tank, an aqueous solution for nucleation which is a reaction aqueous solution in the nucleation process and is a mixture of the pre-reaction aqueous solution and material solution is produced, and fine nuclei of composite hydroxide are produced in the aqueous solution for nucleation. Here, the pH of the aqueous solution for nucleation is within the above-mentioned range, the produced nuclei barely grow and production of nuclei preferentially occurs.

In the nucleation process of the present invention, the quantity of the material solution corresponding to 0.6% to 5.0%, preferably 0.7% to 5.0%, more preferably 0.8 to 4.5%, of the whole amount of substance of the metal element that derives from the metal compound in the material solution that is used for the whole crystallization reaction, is used.

When material solution that have the same mol concentration are used both in the nucleation process and particle growth process, the liquid amount of the material solutions is controlled as an index, for example, 0.6% to 5.0% of the whole liquid amount of the material solutions (when the whole liquid amount of the material solutions is 26 L, 0.156 L to 1.3 L) is used for the nucleation process, and the rest is used for the particle growth process. By making the range like this, it becomes possible to obtain particles having a high tap density with small particle size while controlling aggregation. Further, by suitably controlling the metal element in the material solution used in the nucleation process, even higher sphericity is achieved and it becomes possible to make its packing efficiency even higher.

Moreover, the stirring power requirement to stir the aqueous solution for nucleation is adjusted to 6.0 kW/m$^3$ to 30 kW/m$^3$, preferably 8 kW/m$^3$ to 30 kW/m$^3$, more preferably 10 kW/m$^3$ to 25 kW/m$^3$.

In association with the nucleation due to material solution supply, pH and ammonium ion concentration in the aqueous solution for nucleation change, so material solution is supplied to the aqueous solution for nucleation together with alkali aqueous solution and ammonia aqueous solution to control and maintain the pH of the aqueous solution for nucleation within the range of 12.0 to 14.0 at the solution temperature of 25° C. as a standard and the ammonium ion concentration within the range of 3 g/L to 25 g/L.

By supplying material solution, alkali aqueous solution, and ammonia aqueous solution to the aqueous solution for nucleation, production of new nuclei continuously occurs in the aqueous solution for nucleation. Then, when certain amount of nuclei is produced in the aqueous solution for nucleation, the nucleation process terminates. Judging on whether certain amount of nuclei is produced or not is done by measuring the amount of metal salt added in the aqueous solution for nucleation.

(b) Particle Growth Process

After the nucleation process terminates, by adjusting pH of the aqueous solution for nucleation at the solution temperature of 25° C. as a standard within the range of 10.5 to 12.0, preferably within the range of 11.0 to 12.0, aqueous solution for particle growth which is reaction aqueous solution in the particle growth process is obtained. Specifically, controlling of pH during this adjustment is done by adjusting the amount of supply of alkali aqueous solution. During the particle growth process as well, the stirring power requirement to stir the aqueous solution for particle growth is adjusted to be within the range of 3.0 kW/m$^3$ to 25 kW/m$^3$, preferably 5 kW/m$^3$ to 25 kW/m$^3$, more preferably 6 kW/m$^3$ to 20 kW/m$^3$.

By making the range of pH of the aqueous solution for particle growth as above-mentioned range, nuclei growth reaction preferentially occurs to the nuclei formation reaction, so that new nuclei are barely produced in the aqueous solution for particle growth during the particle growth process and the nuclei grow (particle growth), then nickel manganese containing composite hydroxide having a certain particle size are formed.

Similar to the nucleation process, in the particle growth process too, in accordance with the reaction of particle growth due to material solution supply, pH and ammonium ion concentration of the aqueous solution for particle growth change, so alkali aqueous solution and ammonia aqueous solution are supplied to the aqueous solution for particle growth together with the material solution to control and maintain pH of the aqueous solution for particle growth within the range of 10.5 to 12.0 at the solution temperature of 25° C. as a standard and the ammonium ion concentrate within the range of 3 g/L to 25 g/L.

Here, the atmosphere in the reaction tank is non-oxygen atmosphere. By supplying inert gas to the reaction tank, the reaction atmosphere is controlled to be a non-oxygen atmosphere having an oxygen concentration of 5 volume % or less, preferably 2 volume % or less. When the oxygen concentration becomes higher than 5 volume %, oxidation of metals such as nickel and manganese proceeds and the particles become sparse. Further, the morphology of the grown particles collapses and particles having a high tap density cannot be obtained. "Morphology" here means characteristics related to the shape of particles, average particle size, index indicating the particle size distribution, sphericity, configuration of particles such as crystal structure.

After that, the particle growth process terminates either when the amount of material solution where the amount of liquid used in the nucleation process is excluded, or when the nickel manganese containing composite hydroxide grows to be a certain particle size. Here, the particle size of produced nickel manganese containing composite hydroxide can be easily judged by the amount of the metal salt added in each process when the relation between the amount of added metal salt to the reaction aqueous solution (aqueous solution for nucleation and aqueous solution for particle growth) in each of the nucleation process and particle growth process and the particle size of the obtained particles is obtained by performing a preliminary test.

As stated above, in the manufacturing method of nickel manganese containing composite hydroxide of the present invention, nucleation preferentially occurs in the nucleation process while nuclei growth barely occurs, and in opposite, only nuclei growth occurs in the particle growth process while new nuclei are barely produced. So, in the nucleation process, it is possible to form uniform nuclei having a narrow particle size distribution, and during the particle growth process, nuclei are uniformly grown. Therefore, with the manufacturing method of the present invention, uniform nickel manganese containing composite hydroxide having a narrow particle size distribution can be obtained.

In the present embodiment, aqueous solution for particle growth is prepared by adjusting pH of the aqueous solution for nucleation after nucleation process and the particle growth process is performed after the nucleation process, it has an advantage that moving to the particle growth process can be done quickly. Further, moving from the nucleation process to particle growth process can be done only by adjusting pH of the reaction aqueous solution, so there is an advantage that the pH adjustment can be done easily by temporarily stopping supplying alkali aqueous solution. Here, pH of the material solution can be adjusted by adding mineral acid that is the same kind of the acid of the metal compound, for example, when it is a sulfate, sulfuric acid can be added to the reaction aqueous solution.

However, it may also be possible to prepare content-adjusted aqueous solution having suitable pH and ammonium ion concentration adjusted for particle growth process aside from the aqueous solution for nucleation, and the reaction aqueous solution is prepared by adding aqueous solution (aqueous solution for nucleation, preferably aqueous solution for nucleation with part of its liquid content been removed) having the nuclei formed by performing a nucleation process in a different reaction tank to the content-adjusted aqueous solution, and a particle growth process with this reaction aqueous solution as an aqueous solution for particle growth.

In this case, as the separation of the nucleation process and particle growth process can be achieved more certainly, the conditions of the reaction aqueous solutions in each process can be adjusted to suitable conditions that are ideal for each process. In particular, pH of the aqueous solution for particle growth can be most ideal from the starting point of the particle growth process. So it is possible to make the nickel manganese containing composite hydroxide formed in the particle growth process to have a narrow particle size distribution and to be uniform.

[Controlling pH]

As stated above, in the nucleation process, the pH of the reaction aqueous solution at the solution temperature of 25° C. as a standard needs to be controlled to be within the range of 12.0 to 14.0, preferably within the range of 12.3 to 13.5. When the pH becomes more than 14.0, produced nuclei become too fine so that a problem of gelling the reaction aqueous solution occurs. Further, when the pH is below 12.0, nuclei growth reaction occurs together with nuclei formation, so the particle size distribution range of the formed nuclei becomes wide and ununiform. That is, in the nucleation process, by controlling the pH of the reaction aqueous solution to be within the above-mentioned range, it becomes possible to suppress nuclei growth and almost only nucleation can be performed, so that the formed nuclei can be uniform and have a narrow particle size distribution.

On the other hand, in the particle growth process, the pH of the reaction aqueous solution at the solution temperature of 25° C. as a standard needs to be controlled to be lower than the pH of the nucleation process and to be within the range of 10.5 to 12.0, preferably within the range of 11.0 to 12.0. When the pH becomes more than 12.0, many nuclei are newly formed and fine secondary particles are produced, so that hydroxide having a good particle size distribution cannot be obtained. Further, when the pH is below 10.5, the solubility of ammonium ion is high and unprecipitated metal ions are left in the solution, so that the production efficiency deteriorates. That is, in the particle growth process, by controlling the pH of the reaction aqueous solution to be within the range of the above-mentioned range, it becomes possible to preferentially perform growth of nuclei produced in the nucleation process and suppress new nuclei formation, and obtained nickel manganese containing composite hydroxide can be uniform and have a narrow particle size distribution.

In either both of the nucleation process or particle growth process, fluctuating range of pH is preferably within more than and less than 0.2 of the set value. When the fluctuating range of pH is large, the nucleation and particle growth do not become fixed and there may be a possibility that uniform nickel manganese containing composite hydroxide having a narrow particle size distribution cannot be obtained.

When the pH is 12.0, as it is the boundary condition of the nucleation and nuclei growth, by the presence or absence of nuclei that exist in the reaction aqueous solution, it can be a condition of either the nucleation process or particle growth process.

That is, when the pH in the particle growth process is made 12.0 after great deal of nucleation is performed by making the pH higher than 12, as many nuclei exist in the reaction aqueous solution, nuclei growth preferentially occurs and nickel manganese containing composite hydroxide having a narrow particle size distribution and having relatively large particle size can be obtained.

On the other hand, in case that no nuclei exist in the reaction aqueous solution, in other words, when pH in the nucleation process is 12.0, there are no nuclei to be grown exist so that nucleation preferentially occurs, and by making the pH in the particle growth process less than 12.0, produced nuclei are grown and good nickel manganese containing composite hydroxide can be obtained.

In either case, the pH of the particle growth process may be controlled to be lower than the pH of the nucleation process, and in order to clearly separate the nucleation and particle growth, it is preferable to make the pH of the particle growth process more than 0.5 lower than the pH of the nucleation process, and more preferably more than 1.0 lower.

[Amount of Nucleation]

In order to obtain nickel manganese containing composite hydroxide having a small particle size and good particle size distribution as well as high sphericity, the amount of nuclei produced in the nucleation process is set to within the range of 0.6 mol % to 5.0 mol %, preferably within the range of 0.7 mol % to 5.0 mol %, more preferably within the range of 0.8 mol % to 4.5 mol % of the entire amount, that is, of the whole metal salt supplied to the whole crystallization reaction to obtain composite hydroxide. This can be controlled by adjusting the material solution supply to be used for the nucleation process and particle growth process.

[Metal Compound]

As metal compounds, compounds that include aimed metal are used. The compounds to be used are preferably water soluble compounds such as nitrate, sulfate, and hydrochloride. For example, nickel sulfate, cobalt sulfate, and manganese sulfate are preferably used.

[Stirring Power Requirement]

In the present invention, the particle size and sphericity of nickel manganese containing composite hydroxide are adjusted by controlling stirring power requirement as well as pH and raw material amount supplied for nucleation, during the nucleation process. The stirring power requirement in the nucleation process affects the degree of aggregation of produced nuclei as well as particle growth after that. In order to obtain particles having the median diameter D50 within the range of 1 μm to 6 μm and having a high sphericity, at least in the nucleation process, the stirring power requirement per unit volume of the reaction aqueous solution needs to be controlled to be 6.0 kW/m$^3$ to 30 kW/m$^3$, preferably 10 kW/m$^3$ to 25 kW/m$^3$. By controlling the stirring power requirement, large particle production due to aggregation is suppressed, and the growth of primary particle is moderately adjusted and the particle density itself rises, and the packing density of the cathode active material improves.

When the stirring power requirement in the nucleation process is below 6.0 kW/m$^3$, produced nuclei are tend to aggregate with each other and there is a possibility that the particle size distribution becomes wider and large particles are produced so that the median diameter D50 of the obtained nickel manganese containing composite hydroxide exceeds 6 μm. Further, when aggregation occurs, morphology of the post-growth particles collapses, in other words the sphericity deteriorates, so that it causes lowering of tap density. On the other hand, when the stirring power requirement exceeds 30 kW/m$^3$, the nucleation reaction in the tank becomes unstable due to the heat generated by the stirring, or shearing strength almost does not change and the suppression effect of aggregation does not change. Furthermore, from the safety point of view as well, it is preferable that is does not exceed 30 kW/m$^3$. In the particle growth process, the stirring power requirement can be similar to that of the nucleation process, but as aggregation barely occurs after certain amount of growth, so there is no problem of reacting with stirring power requirement smaller than the nucleation process.

[Concentration of Material Solution]

The concentration of material solution is, in a total of metal compounds, 1 mol/L to 2.6 mol/L, preferably 1.5 mol/L to 2.2 mol/L. When the concentration of material solution is below 1 mol/L, it is not preferable as the productivity lowers because the crystallization amount per reaction tank becomes less.

On the other hand, when the salt concentration of the material solution becomes over 2.6 mol/L, it is more than the saturated concentration at room temperature, there is a danger that crystals precipitate again and may clog up pipes.

Further, metal compounds may not be necessarily supplied to the reaction tank as material solution. For example, in case that metal compounds where compounds are produced after reaction when mixed are used, it may be prepared as an aqueous solution of an individual metal compound at a certain ratio so that the total concentration of the whole metal compound aqueous solution becomes to be within the above-mentioned range, and supplied to the reaction tank simultaneously.

[Ammonia Concentration]

Regarding the ammonia concentration in the reaction aqueous solution, in order not to occur the following problems, it is preferably to be within the range of 3 g/L to 25 g/L, more preferably to be within the range of 5 g/L to 20 g/L and maintain it at a certain value.

As ammonia works as a complexing agent, when the ammonia concentration is below 3 g/L, it becomes impossible to maintain the solubility of metal ion at a certain value so that plate shaped hydroxide primary particles having good shape and particle size cannot be produced and gel nuclei are tend to be produced, so the particle size distribution also tends to be wide.

On the other hand, when the ammonia concentration is over 25 g/L, the solubility of metal ion becomes too high so that the amount of metal ion left in the reaction aqueous solution becomes large and a composition deviation and the like may occur.

Further, when the ammonia concentration fluctuates, the solubility of metal ion fluctuates and uniform hydroxides are not produced, so it is preferable to be maintained at a certain value. For example, the ammonia concentration is preferably maintained at a desired concentration within the range of 5 g/L between the upper and lower limits.

Regarding ammonium ion supplier, although it is not limited to these, for example, ammonium, ammonium sulfate, ammonium chloride, ammonium carbonate, ammonium fluoride or the like can be used.

[Reaction Atmosphere]

In the nucleation process, the atmosphere in the reaction tank is made non-oxygen atmosphere where the oxygen concentration is less than 5 volume %, and preferably less than 2 volume %. When the oxygen concentration becomes more than 5 volume %, the particle density lowers and particles having a high sphericity cannot be obtained even if particle growth is performed later. On the other hand, in the particle growth process as well, the atmosphere in the reaction tank is made non-oxygen atmosphere. When the oxygen concentration becomes more than 5 volume %, oxidation of metals such as nickel and manganese proceeds and particles become sparse. Further, morphology of particles after growth collapses and particles having a high tap density cannot be obtained.

[Reaction Solution Temperature]

The temperature of reaction solution in the reaction tank is set to be preferably higher than 20° C., particularly preferably to be 20° C. to 60° C. When the temperature of reaction solution is below 20° C., controlling becomes difficult as nuclei formation tends to occur due to low solubility. On the other hand, when the temperature of reaction solution is high than 60° C., volatilization of ammonium is accelerated so that excess ammonium ion supplier needs to be added and the manufacturing cost will be high.

[Alkali Aqueous Solution]

Regarding alkali aqueous solution that adjusts pH of the reaction aqueous solution, it is not particularly limited. For example, aqueous solutions of alkali metal hydroxides such as sodium hydroxide and potassium hydroxide can be used. When using such alkali metal hydroxides, it can be directly supplied into the reaction aqueous solution, but as it is easy to control pH of the reaction aqueous solution in the reaction tank, it is preferable to be added to the reaction aqueous solution in the reaction tank as aqueous solution.

The method for adding alkali aqueous solution to the reaction tank is not particularly limited either. It may be added with a pump such as a metering pump that can control the flow rate to maintain the pH of the reaction aqueous solution while sufficiently stirring the reaction aqueous solution.

[Manufacturing Facility]

The manufacturing method of nickel manganese containing composite hydroxide of the present invention uses a device that does not collect products until the reaction terminates. Such device is, for example, a batch reaction tank having a mixer that is normally used. When such a device is employed, unlike a continuous crystallizer that collects products via general overflow that causes a problem that growing particles are collected together with the overflow liquid, particles having a narrow distribution and uniform particle size can be obtained.

Further, as there is a need for controlling the reaction atmosphere, device that can control atmosphere such as closed type device is used. By using this type of device, it becomes possible to make obtained nickel manganese containing composite hydroxide to have the above-mentioned structure, and the nucleation reaction and particle growth reaction can be performed almost uniformly, particles having a narrow particle size distribution can be obtained.

(2-1) Cathode Active Material for a Non-Aqueous Electrolyte Secondary Battery

The cathode active material of the present invention is represented by a general formula of: $Li_aNi_xMn_yM_zO_2$ ($0.95 \leq a \leq 1.15$, $x+y+z=1$, $0.1 \leq x \leq 0.7$, $0.1 \leq y \leq 0.5$, $0.1 \leq z \leq 0.5$; M is one or more of element that is selected from among Co, Ti, V, Cr, Zr, Nb, Mo, Hf, Ta, and W), and it comprises lithium nickel manganese containing composite oxide having a layered hexagonal crystal structure.

[Composition]

The cathode active material of the present invention is lithium nickel manganese containing composite oxide, and the composition is adjusted to be represented by a general formula of $Li_aNi_xMn_yM_zO_2$ ($0.95 \leq a \leq 1.15$, $x+y+z=1$, $0.1 \leq x \leq 0.7$, $0.1 \leq y \leq 0.5$, $0.1 \leq z \leq 0.5$; M is one or more of element that is selected from among Co, Ti, V, Cr, Zr, Nb, Mo, Hf, Ta, and W).

In the cathode active material of the present invention, "a" that represents an excess amount of lithium is within the range of 0.95 to 1.15, preferably within the range of 0.95 to 1.07. When the excess lithium amount "a" is below 0.95, the charging and discharging capacity of the non-aqueous electrolyte secondary battery using obtained cathode active material lowers. Further, as the reaction resistance becomes large, output of the secondary battery becomes low. On the other hand, the charging and discharging capacity increases as the value of "a" becomes large, but when it becomes over 1.15, it may cause sintering and aggregation during firing process and may produce heterogeneous phase such as lithium manganese oxide, and the discharging capacity may lower.

[Median Diameter D50]

The cathode active material of the present invention has a median diameter D50 of within the range of 1 μm to 6 μm. When the median diameter D50 is below 1 μm, the packing efficiency of cathode active material greatly lowers, and it becomes impossible to make the battery capacity per unit weight high. On the other hand, when the median diameter D50 is over 6 μm, although the packing efficiency does not greatly lower, cycling characteristics and specific surface area lower and interface with the electrolyte is reduced, so the resistance at the cathode raises and the output characteristics of the secondary battery lowers.

Therefore, when the median diameter D50 of the cathode active material of the present invention is adjusted to be within the range of 1 μm to 6 μm, preferably within the range of 2 μm to 5.5 μm, the secondary battery using this cathode active material for the cathode can increase the battery capacity per weight as the cathode active material is highly filled, and excellent electrical characteristics such as high cycling characteristics, high safety, and high output can be obtained.

[Particle Size Distribution]

The cathode active material of the present invention has an index [(D90–D10)/D50], which indicates the spread of the particle size distribution, of less than 0.50, preferably less than 0.45. When the particle size distribution is wide, in the cathode active material, there should be many fine particles having a very small particle size relative to the median diameter D50 and many large particles having a large particle size relative to the median diameter D50. When the cathode is formed by using a cathode active material having many fine particles, heat may be generated due to local reactions of the fine particles, so the safety is reduced and the cycling characteristics deteriorate as the fine particles selectively degrade. On the other hand, when the cathode is formed by using a cathode active material having many large particles, the battery output lowers due to the increase in reaction resistance as enough area for the reaction of the electrolyte and cathode active material cannot be obtained.

Therefore, regarding the particle size distribution of the cathode active material, by making the index [(D90–D10)/D50] to be less than 0.50, it becomes possible to make the ratio of fine particle and large particle small, and the battery using this cathode active material for the cathode has excellent safety, as well as good cycling characteristics and battery output. The median diameter D50, D90, and D10 are the same with that of used for the above-mentioned nickel manganese containing composite hydroxide, and measurement can be done in the same manner.

The more the index is small, the better electrical characteristics can be obtained, but the lower limit is about 0.1 as is the case with the nickel manganese containing composite hydroxide.

[Particle Structure]

Figure 2:
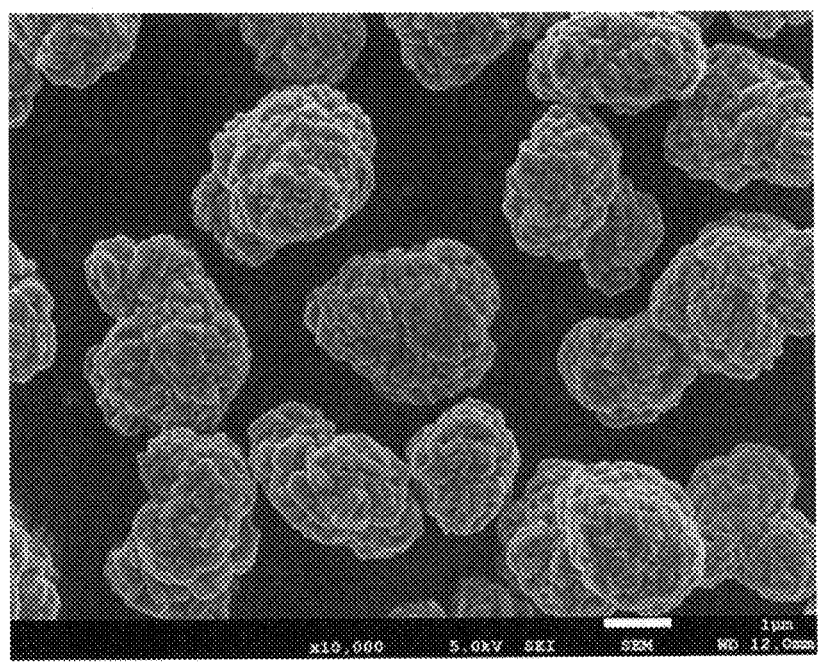
FIG. 2 is a SEM image of the cathode active material for a non-aqueous electrolyte secondary battery of the present invention.

The cathode active material of the present invention, as illustrated in FIG. 2 and as is the case with the nickel manganese containing composite hydroxide of the present invention, comprises secondary particles that are formed by an aggregation of primary particles. The sphericity $\Psi_W$ of the particles is preferably within the range of 0.60 to 0.98, and more preferably within the range of 0.70 to 0.95. By making the sphericity $\Psi_W$ of the particles to be within the range of 0.60 to 0.98, the packing efficiency of the cathode active material becomes higher, and high energy density can be obtained. When the sphericity is below 0.60 or over 0.98, the packing efficiency becomes poor and gap may occur, so that there may be a possibility that high energy density cannot be obtained. To measure the Wadell's sphericity $\Psi_W$, a laser diffraction scattering type particle size measuring device with image analysis or a scanning electron microscope image can be used. It can be obtained by observing dozens to several hundreds of particles, calculating their Wadell's sphericity $\Psi_W$, and obtaining their average value.

(2-2) Manufacturing Method of Cathode Active Material for Non-Aqueous Electrolyte Secondary Battery The manufacturing method of the cathode active material of the present invention is not particularly limited as long as cathode active material can be manufactured to have said average particle size, particle size distribution, particle structure and composition, but it is preferable to employ the following method as such cathode active material can be manufactured more certainly.

The manufacturing method of the cathode active material of the present invention includes steps of (a) mixing process to form mixture by mixing nickel manganese containing composite hydroxide and lithium compound that are the raw material of the cathode active material, and (b) firing process to sinter the mixture that is formed in the mixing process. Each step will be explained as follows.

(a) Mixing Process

Mixing process is where lithium mixture is obtained by mixing nickel-cobalt-manganese-containing composite hydroxide (precursor) that is obtained in the crystallization process and lithium compound. As for the lithium compound, lithium carbonate, lithium hydroxide, lithium nitrate, lithium chloride and the like can be selected, but it is desired to use lithium carbonate or lithium hydroxide in view of reactivity and impurities contamination. For mixing lithium compound and nickel-cobalt-manganese-containing composite hydroxide, shaker mixer, LÖDIGE mixer, Julia mixer, V-type blender and the like can be used. It is enough to sufficiently mix lithium compound and nickel manganese containing composite hydroxide to the extent that the frame of nickel manganese containing composite hydroxide is not destroyed. In the lithium mixture, the nickel-cobalt-manganese-containing composite hydroxide and lithium compound are mixed to have the ratio of the number of elements of lithium and other than lithium (hereinafter referred to as "Li/Me") to be within the range of 0.95 to 1.15. That is, it is mixed to make the Li/Me of the lithium mixture to be the same as of the cathode active material of the present invention. This is because the Li/Me does not change before and after the firing process, so that the Li/Me mixed in the mixing process becomes the Li/Me of cathode active material.

(b) Firing Process

In the firing process, the lithium mixture that is obtained in the mixing process undergoes heat treatment producing lithium transition metal composite oxide.

The heat treatment of the lithium mixture is performed by firing in an oxidizing atmosphere while keeping the firing temperature at within the range of 750° C. to 1,000° C. for 5 to 20 hours. The firing may be performed as two-phase firing, as long as the firing temperature of the first phase is lower than the firing temperature of the second phase. For example, when the firing temperature of the second phase is 900° C., the firing temperature of the first phase can be any temperature that is selected from the range of about 700° C. to 800° C.

The firing temperature is within the range of 750° C. to 1,000° C., preferably within the range of 780° C. to 950° C., more preferably within the range of 800° C. to 900° C., and it should be maintained preferably for 5 to 10 hours. When the firing temperature is below 750° C., lithium does not diffuse into the precursor sufficiently so that excess lithium or unreacted particles may be left and the crystal structure becomes insufficient, therefore a problem that sufficient electrical characteristics cannot be obtained occurs. Further, when the firing temperature becomes over 1,000° C., acute sintering occurs between formed lithium composite oxides, and there is also a possibility that abnormal grain growth may occur. When abnormal grain growth occurs, particles after sintering become large and there may be a probability that the particle form cannot be maintained. As a result, when a cathode active material is formed, the specific surface area lowers and the resistance of the cathode rises, so that a problem of lowering of the battery capacity occurs. Further, there is a possibility that the electrical characteristics lowers as cation mixing occurs.

A furnace that is used for the firing is not particularly limited, and it may be any furnace as long as it can sinter lithium mixture in an air atmosphere or in an oxygen flow, but it is preferable to use an electric furnace as it does not generate gas, and either batch type furnace or furnace of continuous operation may be used.

Regarding the lithium composite oxide that is obtained by the firing, although the sintering between particles is suppressed, large particles may be formed due to sintering and aggregation. In such a case, it is preferable to adjust the particle size distribution by cracking the sintering and aggregation.

(3) Non-Aqueous Electrolyte Secondary Battery

The non-aqueous electrolyte secondary battery of the present invention employs the cathode material using the cathode active material for a non-aqueous electrolyte secondary battery of the present invention. The structure of the non-aqueous electrolyte secondary battery of the present invention will be explained as follows.

The non-aqueous electrolyte secondary battery of the present invention has, except for using the cathode active material of the present invention for the cathode material, substantially the same structure as that of typical non-aqueous electrolyte secondary battery.

Specifically, the secondary battery of the present invention has a structure comprising a case, and a cathode, anode, non-aqueous electrolyte and separator that are housed inside this case. More specifically, electrodes are formed by layering the cathode and anode by way of the separator, and the electrodes are then impregnated with the non-aqueous electrolyte, then collector leads or the like are used to connect between the cathode collector and a cathode terminal that goes to the outside, and between the anode collector and an anode terminal that goes to the outside; this is then sealed in the case to complete the non-aqueous electrolyte secondary battery of the present invention.

Needless to say, the structure of the secondary battery of the present invention is not limited to the above examples, and various shapes such as cylindrical shape and laminated form can be employed for the external form.

[Cathode]

The cathode which characterizes the secondary battery of the present invention will be explained as follows. The cathode is a sheet-like member, and it is formed by applying cathode mix paste that contains the cathode active material of the present invention, for example, on the surface of an aluminum foil current collector, and then dried.

The cathode is suitably treated in accordance with the type of a battery to which the cathode is applied. For example, treatments such as cutting treatment that forms suitable size in accordance with an aimed battery, or pressurizing and compressing process that applies pressure with a roll press and the like to increase the electrode density will be performed.

The cathode mix paste is made by adding a solvent to the cathode material and then kneading this mixture. The cathode material is made by mixing a conductive material and bonding agent with powdered cathode active material of the present invention.

The conductive material is added to give a suitable conductivity to the electrode. The conductive material is not particularly limited, and materials such as graphite (natural graphite, artificial graphite, expanded graphite, and the like), or a carbon black material such as acetylene black, Ketjenblack and the like can be used.

The bonding agent acts to secure cathode active material particles. As for the bonding agent used for this cathode material, it is not particularly limited, but it is possible to use, for example, polyvinylidene fluoride (PVDF), polytetrafluoroethylene (PTFE), fluororubber, ethylene propylene diene rubber, styrene butadiene, cellulose resin, polyacrylic acid and the like.

It is also possible to add, for example, activated carbon to the cathode material. By adding such as activated carbon, it becomes possible to increase the electric double-layer capacity of the cathode.

The solvent dissolve the bonding agent and disperse the cathode active material, conductive material and activated carbon to the bonding agent. The solvent is not particularly limited, but organic solvent such as N-methyl-2-pyrrolidone can be used as the solvent.

The mixture ratios in the cathode mix paste are not particularly limited. For example, when the solid content of the cathode material without the solvent is taken to be 100 parts by mass, then, as in the case of a general cathode of a non-aqueous electrolyte secondary battery, the content of the cathode active material is taken to be 60 parts by mass to 95 parts by mass, the content of conductive material is taken to be 1 part by mass to 20 parts by mass, and the content of bonding agent is taken to be 1 part by mass to 20 parts by mass.

[Anode]

Anode is a sheet-like member that is formed by applying anode mix paste on to the surface of a metal foil, for example, copper foil current collector, and then drying. Although the constituents that comprise the anode mix paste and their combination and material for the current collector are different, the anode is formed by a method that is substantially the same as that of the cathode, and as is the case with the cathode, various processing will be performed as necessary.

The anode mix paste is made as past-like by adding suitable solvent to the anode material that is a mixture of anode active material and bonding agent.

As the anode active material, material that includes lithium such as metal lithium and lithium alloy, or storing substance that is able to store or desorb lithium ion can be employed.

The storing substance is not particularly limited, but, for example, an organic compound sintered body such as natural graphite, artificial graphite, phenol resin and the like, or powdered carbon material such as coke can be used. When such a storing substance is employed for the anode active material, as is the case with the cathode, as the anode binding agent, it is possible to use a fluororesin that includes PVDF and the like, and as the solvent for dispersing the anode active material and the binding agent, it is possible to use an organic solvent such as N-methyl-2-pyrrolidone and the like.

[Separator]

The separator is arranged so as to be held between the cathode and the anode, and has the function of separating the cathode and the anode and maintaining the electrolyte. As such a separator, it is possible to use, for example, a thin film of polyethylene, polypropylene and the like, having many fine holes, however, the separator is not particularly limited as long as it has the functions described above.

[Non-Aqueous Electrolyte]

The non-aqueous electrolyte is formed by dissolving lithium salt as a supporting salt into an organic solvent.

As the organic solvent, it is possible to use a single kind or a mixture of two or more kinds selected from: a cyclic carbonate such as ethylene carbonate, propylene carbonate, butylene carbonate, trifluoro propylene carbonate and the like; a chain carbonate such as diethyl carbonate, dimethyl carbonate, ethyl methyl carbonate, dipropyl carbonate and the like; an ether compound such as tetrahydrofuran, 2-methyltetrahydrofuran, dimethoxyethane and the like; a sulfur compound such as ethyl methyl sulfone, butane sultone and the like; and a phosphorus compound such as triethyl phosphate, trioctyl phosphate and the like.

As the supporting salt, it is possible to use $LiPF_6$, $LiBF_4$, $LiClO_4$, $LiAsF_6$, $LiN(CF_3SO_2)_2$ and a composite of these.

Furthermore, the non-aqueous electrolyte may also include a radical scavenger, a surfactant, a flame retardant and the like in order to improve electrical characteristics.

[Characteristics of the Non-Aqueous Electrolyte Secondary Battery of the Present Invention]

The non-aqueous electrolyte secondary battery of the present invention has the above-mentioned structure as well as a cathode using the cathode active material of the present invention, so it has a high initial discharging capacity and excellent cycling characteristics. Further, the packing efficiency is high compared to the cathode active material of conventional lithium nickel oxides, so the energy density can be said high.

EXAMPLES

Example 1

[Manufacturing Method of Nickel Manganese Containing Composite Hydroxide]

The nickel manganese containing composite hydroxide is manufactured by the following method. In all examples, samples using special grade chemicals manufactured by Wako Pure Chemical Industries Co., Ltd. were used for manufacturing the nickel manganese containing composite hydroxide, a cathode active material, and the secondary battery.

(Nucleation Process)

First, 1.2 L of water was put into a reaction tank (6 L) and, while stirring, the tank temperature was set to 42° C. The inside atmosphere of the reaction tank at this time was set to non-oxygen atmosphere (oxygen concentration: 1% by volume). By adding proper amount of sodium hydroxide aqueous solution of 25% by mass and ammonia water of 25% by mass to the water inside the reaction tank, to adjust the pH of the reaction solution within the tank to be 13.2 at the solution temperature of 25° C. as a standard, as well as the ammonia concentration to be 13 g/L, pre-reaction aqueous solution was prepared.

Next, by dissolving nickel sulfate, cobalt sulfate, and manganese sulfate into water and 2.5 L of 2.0 mol/L material solution was prepared. It was adjusted for this material solution that the molar ratio of each metal elements to be Ni:Co:Mn=54:20:26.

0.1 L of this material solution was added to the pre-reaction aqueous solution in the reaction tank under the stirring power requirement of 21 $kW/m^3$ and at the ratio of 12.5 mL/min to prepare reaction aqueous solution (in the nucleation process, 4.0% of the whole amount of the material solution used for the whole crystallization process was used). At the same time, ammonia water of 25% by mass and sodium hydroxide aqueous solution of 25% by mass were added to this reaction aqueous solution at a constant speed, and while maintain the ammonia concentration of the aqueous solution for nucleation at the above-mentioned value and control the pH to be 13.2 at the solution temperature of 25° C. as a standard (pH of nucleation), crystallization was performed for 8 minutes and nucleation was performed.

(Particle Growth Process)

After the termination of nucleation, only the supply of sodium hydroxide aqueous solution of 25% by mass was paused until the pH of the reaction aqueous solution becomes 11.6 at the solution temperature of 25° C. as a standard.

After the pH of the reaction aqueous solution became 11.6 at the solution temperature of 25° C. as a standard, the stirring power requirement was adjusted to be 6.0 $kW/m^3$, supplying sodium hydroxide aqueous solution of 25% by mass to the reaction aqueous solution (aqueous solution for particle growth) was resumed. While maintaining the ammonia concentration at 13 g/L and controlling the pH to be 11.6 at the solution temperature of 25° C. as a standard, 2.4 L of material solution was added at the ratio of 12.5 mL/min, and after supplying the whole amount and performing crystallization, the crystallization was terminated. Then, the product was washed, filtered, and dried to obtain nickel manganese containing composite hydroxide. The ratio of the material solution used for the nucleation process was 4.0%. In the crystallization, the pH was controlled by adjusting the supply flow rate of the sodium hydroxide aqueous solution with a pH controller, and the fluctuating range was within plus/minus 0.2 from the set value.

(Analysis of Composite Hydroxide)

Regarding the obtained composite hydroxide, after dissolving its sample with mineral acid and performing chemical analysis by an ICP emission spectrography, the composition was found to be $Ni_{0.54}Co_{0.20}Mn_{0.26}(OH)_2$.

Further, regarding this nickel manganese containing composite hydroxide, the median diameter D50 and an index of [(D90−D10)/D50], which indicates the spread of the particle size distribution, were calculated from the volume integrated value measured by using a laser diffraction scattering type particle size measuring device (manufactured by Nikkiso Co., Ltd.; micro track HRA). As a result, the median diameter D50 was 2.9 μm and the index of [(D90−D10)/D50] was 0.40.

Next, the shape of the obtained nickel manganese containing composite hydroxide was observed by using a SEM (manufactured by Hitachi High-Technologies Corporation; scanning electron microscope S-4700), it was found out to be approximately spherical, and the particle size was approximately uniform. The observation result obtained by the SEM is shown in FIG. 1. The Wadell's sphericity of the particles was calculated from the SEM image, and the tap density according to JIS2512:2012 was obtained by using a tapping machine (manufactured by Kuramochi Kagakukiki; KRS-406). As a result, the Wadell's sphericity was 0.85 and the tap density was 1.71 g/cm$^3$.

(Manufacturing Cathode Active Material)

(1) Mixing Process

Obtained nickel-cobalt-manganese-containing composite hydroxide and lithium carbonate were weighed to be Li/Me=1.05, and then sufficiently mixed with a shaker mixer device (Willy A. Bachofen AG; TURBULA TypeT2C) on the strength that the frame of the precursor can be maintained to obtain lithium mixture.

(2) Firing Process

This lithium mixture was put in a sintering container made of magnesia, and then, using a closed-type electric furnace, in an air atmosphere with a flow rate of 10 L/min, it was heated to 720° C. at the heating-up speed of 2.77° C./min and maintained it for 2 hours to perform the first step of the firing process. Then, at the same heating up speed, it was heated to 850° C. and maintained for 5 hours to perform the second step of the firing process. After this, it was cooled to the room temperature and lithium nickel manganese cobalt composite oxide was obtained as a cathode active material.

(Analyzing Cathode Active Material)

In the same method as in the nickel manganese containing composite hydroxide, when measured the particle size distribution of the obtained cathode active material, the median diameter D50 was 3.1 μm and the value of [(D90−D10)/D50] was 0.42.

Further, in the same method as in the nickel manganese containing composite hydroxide, when observed the cathode active material with the SEM, it was found that the obtained cathode active material is approximately spherical, and the particle size was approximately uniform. The SEM observation results of this cathode active material are shown in FIG. 2. Regarding the obtained cathode active material, the Wadell's sphericity of the particles was calculated from the SEM image, and the tap density according to JIS2512:2012 was obtained with a tapping machine (Kuramochi Kagakukiki; KRS-406). As a result, the Wadell's sphericity was 0.73 and the tap density was 2.18 g/cm$^3$.

Further, by analyzing the obtained cathode active material with a powder X-ray diffraction by Cu-Kα ray using an X-ray diffraction device (Spectris Co., Ltd.; X'Pert PRO), it was found that the construction and crystal structure of this cathode active material was a single-phase of layered hexagonal crystal lithium nickel manganese containing composite oxide.

Further, in the same manner, by analyzing the composition of the cathode active material by an ICP emission spectrography, it was found that the composition was $Li_{1.05}Ni_{0.54}Co_{0.20}Mn_{0.26}O_2$.

(Manufacturing Secondary Battery)

Figure 3:
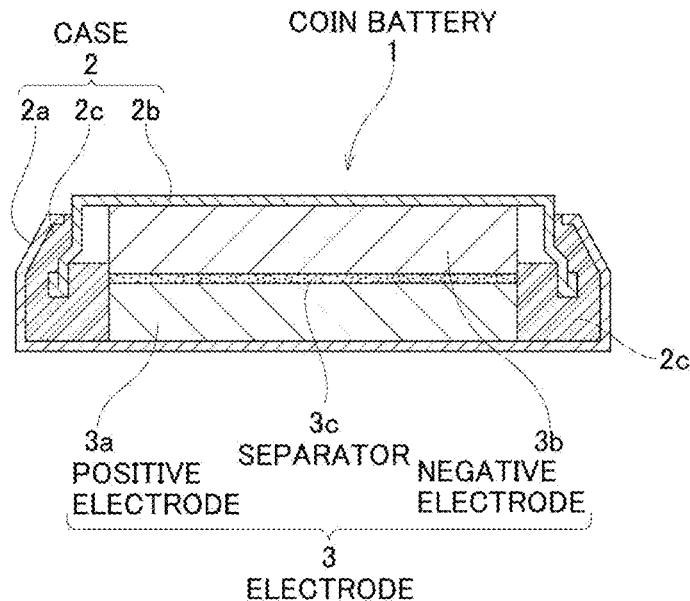
FIG. 3 is a cross-sectional view of a coin battery that was used for evaluation.

To evaluate the obtained cathode active material, 2032-type coin battery was used. As shown in FIG. 3, this coin battery 1 comprises a case 2 and electrode 3 that is housed inside this case 2.

The case 2 has a cathode can 2a that is hollow and that is opened on one end, and an anode can 2b that is arranged in the opening section of this cathode can 2a, and is constructed so that when the anode can 2b is arranged in the opening section of the cathode can 2a, a space is formed between the anode can 2b and the cathode can 2a that houses the electrode 3.

The electrode 3 comprises a cathode 3a, a separator 3c and an anode 3b, that are layered in that order, and housed in the case 2 so that the cathode 3a comes in contact with the inner surface of the cathode can 2a, and the anode 3b comes in contact with the inner surface of the anode can 2b.

The case 2 comprises a gasket 2c, and is secured by this gasket 2c so that the cathode 2a and anode 2b are maintained in an electrically insulated state. Moreover, the gasket 2c has a function of sealing the gap between the cathode can 2a and anode can 2b so that the inside of the case 2 is sealed off from the outside so as to be airtight and fluid-tight.

The coin battery 1 was manufactured as described below. First, the 52.5 mg of the obtained cathode active material was mixed with 15 mg of acetylene black and 7.5 mg of polytetrafluoroethylene resin (PTFE), then pressed at a pressure of 100 MPa to form a cathode having an 11 mm diameter and 100 μm thickness, and the cathode 3a was obtained. This cathode 3a was then dried in a vacuum drier for 12 hours at 120° C. Using this cathode 3a, anode 3b, separator 3c and electrolyte, a coin battery 1 was manufactured inside a glovebox in an Ar atmosphere, the dew point of which was controlled to −80° C.

An anode sheet that was formed by coating copper foil with graphite powder and polyvinylidene fluoride and punched into a disk shape having a 14 mm diameter was used as the anode 3b. Moreover, porous polyethylene film having a film thickness of 25 μm was used as the separator 3c. 1 M of a mixed solution having equal parts of ethylene carbonate (EC) and diethyl carbonate (DEC) and $LiClO_4$ as the supporting electrolyte (manufactured by Tomiyama Pure Chemical Industries, Ltd.) was used as the electrolyte.

(Evaluation of Battery)

The initial discharge capacity, cycle capacity retention rate, and cathode resistance which are performance evaluation items for the obtained coin battery 1 are defined below.

The initial discharge capacity is the capacity at that time, after making the coin battery 1, the coin battery 1 was left for 24 hours, and after the open circuit voltage (OCV) became stable, the coin battery 1 was charged to a cut-off voltage of 4.3 V with the current density with respect to the cathode being 0.1 mA/cm$^2$, and after stopping for one hour, the coin battery 1 was discharged to a cut-off voltage of 3.0 V.

Regarding the cycle capacity retention rate, a cycle in which charging up to 4.1 V and discharging up to 3.0 V are performed at 60° C. with currency density with respect to the cathode being 2 mA/cm$^2$, is repeated for 500 times, then, the ratio of the discharging capacity and the initial discharging capacity after repeating charge and discharge was calculated to obtain the cycle capacity retention rate. To measure the charging and discharging capacity, multi-channel voltage/current generator (manufactured by Advantest Corporation; R6741A) was used.

Figure 4:
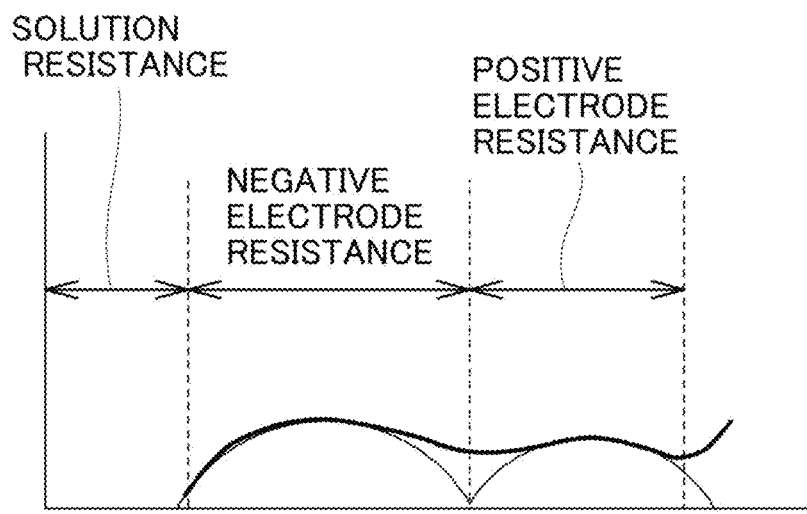
FIG. 4 is a drawing for explaining an equivalent circuit that was used for measurement and analysis in impedance evaluation.
Figure 4:
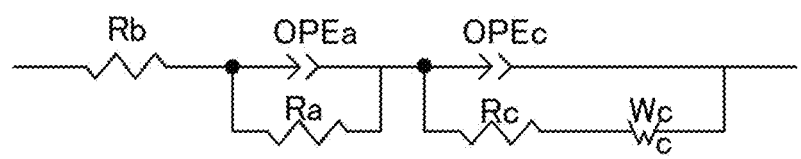

Regarding the cathode resistance, it was evaluated as follows. The coin battery 1 was charged to a charge potential of 4.1 V, and by using a frequency response analyzer and a potentio-galvanostat (manufactured by Solatron Analytical; 1255B) to measure the resistance value by an alternating current impedance method, the Nyquist plot illustrated in FIG. 4 was obtained. This Nyquist plot is expressed as a sum of characteristic curves that indicate the solvent resistance, anode resistance and capacity, and cathode resistance and capacity, so the value of the cathode resistance was calculated by fitting calculation using an equivalent circuit based on this Nyquist plot.

Regarding the coin battery that has a cathode being formed using the above cathode active material, when a battery evaluation was performed, the initial discharging capacity was 179.1 mAh/g and the cathode resistance was 2.1Ω. Further, the capacity retention rate after 500 cycles was 82.3%.

The characteristics of the nickel manganese containing composite hydroxide obtained by this example are shown in Table 1, and each evaluation of the characteristics of the cathode active material and the coin battery being manufactured by using this cathode active material are shown in Table 2.

Similarly, results obtained in the following examples 1 through 4 and comparative examples 1 through 9 are shown in Table 1 and Table 2.

Example 2

In the nucleation process during nickel manganese containing composite hydroxide manufacturing process, except for making the pH of the reaction solution in the tank to be 13.0, a cathode active material for a non-aqueous electrolyte secondary battery was obtained and evaluated in the same manner as in Example 1.

Example 3

In the nucleation process during nickel manganese containing composite hydroxide manufacturing process, except for making the amount of the material solution to be added to the pre-reaction aqueous solution in the tank to be 0.05 L (in the nucleation process, 2.0% of the whole amount of the material solution used for the whole crystallization process was used) and making the pH of the reaction solution to be 13.0, a cathode active material for a non-aqueous electrolyte secondary battery was obtained and evaluated in the same manner as in Example 1.

Example 4

In the nucleation process during nickel manganese containing composite hydroxide manufacturing process, except for making the pH of the reaction solution in the reaction tank to be 13.0 and making the pH of the reaction solution in the reaction tank in the particle growth process to be 11.8, a cathode active material for a non-aqueous electrolyte secondary battery was obtained and evaluated in the same manner as in Example 1.

Comparative Example 1

In the nucleation process during nickel manganese containing composite hydroxide manufacturing process, except for making the amount of the material solution to be added to the pre-reaction aqueous solution in the tank to be 0.0125 L (in the nucleation process, 0.5% of the whole amount of the material solution used for the whole crystallization process was used), a cathode active material for a non-aqueous electrolyte secondary battery was obtained and evaluated in the same manner as in Example 1.

Comparative Example 2

In the nucleation process during nickel manganese containing composite hydroxide manufacturing process, except for making the amount of the material solution to be added to the pre-reaction aqueous solution in the tank to be 0.625 L (in the nucleation process, 25% of the whole amount of the material solution used for the whole crystallization process was used), a cathode active material for a non-aqueous electrolyte secondary battery was obtained and evaluated in the same manner as in Example 1.

Comparative Example 3

In the nucleation process during nickel manganese containing composite hydroxide manufacturing process, except for making the pH in the reaction tank to be 13.0 and making the oxygen concentration to be 8 volume %, a cathode active material for a non-aqueous electrolyte secondary battery was obtained and evaluated in the same manner as in Example 1.

Comparative Example 4

In the nucleation process during nickel manganese containing composite hydroxide manufacturing process, except for making the pH of the reaction solution in the reaction tank to be 11.0 at the solution temperature of 25° C. as a standard, a cathode active material for a non-aqueous electrolyte secondary battery was obtained and evaluated in the same manner as in Example 1.

Comparative Example 5

In the particle growth process during nickel manganese containing composite hydroxide manufacturing process, except for making the pH of the reaction solution in the reaction tank to be 10.0 at the solution temperature of 25° C. as a standard, a cathode active material for a non-aqueous electrolyte secondary battery was obtained and evaluated in the same manner as in Example 1.

Comparative Example 6

In the nucleation process during nickel manganese containing composite hydroxide manufacturing process, except for making the stirring power requirement to be 4.0 kW/m$^3$, a cathode active material for a non-aqueous electrolyte secondary battery was obtained and evaluated in the same manner as in Example 1.

Comparative Example 7

In the firing process during cathode active material manufacturing process, except for making Li/Me to be 0.92 by using the nickel manganese containing composite hydroxide made in Example 1 as a precursor, a cathode active material for a non-aqueous electrolyte secondary battery was obtained and evaluated in the same manner as in Example 1.

Comparative Example 8

In the firing process during cathode active material manufacturing process, except for making the firing temperature of the first and second steps to be 730° C. by using the nickel manganese containing composite hydroxide made in Example 1 as a precursor, a cathode active material for a non-aqueous electrolyte secondary battery was obtained and evaluated in the same manner as in Example 1.

Comparative Example 9

In the firing process during cathode active material manufacturing process, except for making the firing temperature of the second step to be 1,050° C. by using the nickel manganese containing composite hydroxide made in Example 1 as a precursor, a cathode active material for a non-aqueous electrolyte secondary battery was obtained and evaluated in the same manner as in Example 1.

characteristics as they have a high initial discharging capacity and efficiency, excellent cycling characteristics, and low cathode resistance.

TABLE 1

| | Manufacturing Process Parameters | | | | | Particles Characteristic Parameters | | | |
|---|---|---|---|---|---|---|---|---|---|
| | Raw Material | Oxygen | Stirring Power Requirement | pH at | | | | | |
| Items | Solution Ratio at Nucleation Process (%) | Concentration in Reaction Tank (vol %) | Per Unit Volume at Nucleation Process (kW/m³) | pH at Nucleation Process (25° C.) | Particle Growth Process (25° C.) | Median Diameter D50 (μm) | [(D90 − D10)]/ D50 | Tap Density (g/ml) | Wadell's Sphericity |
| Example 1 | 4.0 | 1.0 | 21 | 13.2 | 11.6 | 2.9 | 0.40 | 1.71 | 0.85 |
| Example 2 | 4.0 | 1.0 | 21 | 13.0 | 11.6 | 3.2 | 0.41 | 1.70 | 0.86 |
| Example 3 | 2.0 | 1.0 | 21 | 13.0 | 11.6 | 5.5 | 0.45 | 2.00 | 0.75 |
| Example 4 | 4.0 | 1.0 | 21 | 13.0 | 11.8 | 4.5 | 0.40 | 1.90 | 0.79 |
| CE 1 | 0.5 | 1.0 | 21 | 13.2 | 11.6 | 6.1 | 0.48 | 1.97 | 0.64 |
| CE 2 | 25 | 1.0 | 21 | 13.2 | 11.6 | 6.8 | 0.55 | 1.90 | 0.62 |
| CE 3 | 4.0 | 8.0 | 21 | 13.0 | 11.6 | 4.1 | 0.43 | 1.31 | 0.73 |
| CE 4 | 4.0 | 1.0 | 21 | 11.0 | 11.6 | 6.5 | 0.50 | 1.78 | 0.66 |
| CE 5 | 4.0 | 1.0 | 21 | 13.2 | 10.0 | 7.2 | 0.62 | 1.85 | 0.75 |
| CE 6 | 4.0 | 1.0 | 4.0 | 13.2 | 11.6 | 6.4 | 0.65 | 1.74 | 0.68 |

*CE: Comparative Example

TABLE 2

| | Manufacturing Process Parameters | | | Particles Characteristic Parameters | | | | Battery Characteristics | | | Capacity |
|---|---|---|---|---|---|---|---|---|---|---|---|
| Items | Li/Me Ratio (%) | First Step Firing Temp. (° C.) | Second Step Firing Temp. (° C.) | Median Diameter D50 (μm) | [(D90 − D10)]/ D50 | Tap Density (g/ml) | Wadell's Sphericity | Discharge Capacity (mAh/g) | Efficiency (%) | Resistance (Ω) | Retention Rate (After 500 Cycles) |
| Example 1 | 1.05 | 720 | 850 | 3.1 | 0.42 | 2.18 | 0.73 | 179.1 | 92.2 | 2.1 | 82.3 |
| Example 2 | 1.05 | 720 | 850 | 3.5 | 0.43 | 2.21 | 0.70 | 178.8 | 92.0 | 2.3 | 82.0 |
| Example 3 | 1.05 | 720 | 850 | 5.6 | 0.45 | 2.10 | 0.65 | 174.9 | 90.0 | 2.3 | 81.5 |
| Example 4 | 1.05 | 720 | 850 | 4.6 | 0.46 | 2.12 | 0.69 | 176.7 | 91.3 | 2.2 | 82.0 |
| CE 1 | 1.05 | 720 | 850 | 6.4 | 0.51 | 2.10 | 0.58 | 171.3 | 89.7 | 2.6 | 79.2 |
| CE 2 | 1.05 | 720 | 850 | 7.1 | 0.58 | 2.11 | 0.55 | 170.1 | 89.5 | 2.8 | 78.8 |
| CE 3 | 1.05 | 720 | 850 | 4.3 | 0.46 | 1.72 | 0.62 | 170.4 | 89.8 | 3.2 | 79.5 |
| CE 4 | 1.05 | 720 | 850 | 6.7 | 0.48 | 2.08 | 0.57 | 170.6 | 89.4 | 2.7 | 78.4 |
| CE 5 | 1.05 | 720 | 850 | 7.6 | 0.65 | 2.14 | 0.56 | 171.1 | 89.5 | 2.5 | 78.0 |
| CE 6 | 1.05 | 720 | 850 | 6.5 | 0.64 | 2.10 | 0.50 | 172.0 | 88.7 | 2.4 | 78.2 |
| CE 7 | 0.92 | 720 | 850 | 2.9 | 0.41 | 1.92 | 0.62 | 165.3 | 87.3 | 3.3 | 74.3 |
| CE 8 | 1.05 | 730 | 730 | 3.2 | 0.48 | 1.82 | 0.59 | 160.1 | 84.2 | 4.1 | 68.9 |
| CE 9 | 1.05 | 720 | 1050 | 5.2 | 0.76 | 1.60 | 0.41 | 163.5 | 86.1 | 3.8 | 70.2 |

*CE: Comparative Example (Evaluation)

Regarding the nickel manganese containing composite hydroxides of Examples 1 through 4, each of them has an index [(D90−D10)/D50], which indicates the spread of the particle size distribution, within a preferable range, and their particle size distribution is also within a predetermined range, so that they are particles having approximately uniform particle size. Further, the Wadell's sphericity is large, and the tap density is high regardless of its small particle size, so they are optimum particles as a precursor of a cathode active material showing a high energy density.

Further, regarding the cathode active materials of the present invention as well, the median diameter D50 and the value of [(D90−D10)/D50] are within a preferable range, and they have a high tap density and sphericity, so they are particles having an excellent packing efficiency. A coin battery using these cathode active materials have excellent On the other hand, in Comparative Example 1, the median diameter D50 is large as the amount of produced nuclei was small since the ratio of the amount of material solution in the nucleation process is small. The sphericity is also below the preferable range. Therefore, obtained cathode active material has a large median diameter D50, low initial discharging capacity and efficiency, and due to a decrease in the specific surface area associated with an increase in the particle size, a rise in the resistance can also be seen. Further, deterioration in the cycling characteristics can also be seen.

In Comparative Example 2, as the ratio of amount of the material solution in the nucleation process is large, although the amount of produced nuclei is large, aggregation occurs so that the substantial amount of nuclei becomes small eventually. Therefore, the median diameter D50 after particle growth becomes large, and the sphericity lowers as they are aggregated particles. Therefore, although the obtained cathode active material has a low sphericity and a large median diameter D50, the tap density is low. As the median diameter D50 is large, the initial discharging capacity and efficiency are low, and due to a decrease in the specific surface area associated with an increase in the particle size, a rise in the resistance can also be seen. Further, deterioration in the cycling characteristics can also be seen.

In Comparative Example 3, as the oxygen concentration in the crystallization process is set to be high, oxidation of metal element (especially manganese) occurs, and plate shaped primary particles are produced. As a result, the tap density of the particles is extremely lowered. Therefore, the obtained cathode active material also has a low tap density and it is hard to obtain a high energy density. Further, as the primary particles are large, due to a decrease in the specific surface area, a rise in the resistance can also be seen, and the capacity also becomes low. Further, deterioration in the cycling characteristics can also be seen.

In Comparative Example 4, as the pH of the nucleation process was made low, the amount of produced nuclei became low, and aggregated nuclei having a bad sphericity were produced, so the median diameter D50 after particle growth is large and sphericity is low. Therefore, the obtained cathode active material also has a low tap density although the median diameter D50 is large. Further, as the median diameter D50 is large, the initial discharging capacity and efficiency are low, and due to a decrease in the specific surface area associated with an increase in the particle size, a rise in the resistance can also be seen. Further, deterioration in the cycling characteristics can also be seen.

In Comparative Example 5, as the pH of particle growth process is low, the median diameter D50 is large, and particles have a wide particle size distribution. Further, as the particles are grown in a low pH region, its sphericity is high. Therefore, the obtained cathode active material also has a large median diameter D50 and are particles having a wide particle size distribution. Further, although the tap density is high, as the particle size distribution is wide, the initial discharging capacity and efficiency is low, and due to a decrease in the specific surface area associated with an increase in the particle size, a rise in the resistance can also be seen. Further, deterioration in the cycling characteristics can also be seen.

In Comparative Example 6, as the stirring power requirement in the nucleation process is low, the median diameter D50 is large, so the particles have a wide particle size distribution. Further, as an aggregation occurs in the nucleation process, the particles have a low sphericity. Therefore, the obtained cathode active material also has a large median diameter D50 and the particles have a wide particle size distribution. Further, the sphericity is also low. In addition, the initial discharging capacity and efficiency are low compared to that of the Examples, and due to a decrease in the specific surface area associated with an increase in the particle size, a rise in the resistance can also be seen. Further, deterioration in the cycling characteristics can also be seen.

In Comparative Example 7, as the Li/Me ratio is small, the crystalline of the cathode active material is low. Therefore, the initial discharging capacity and efficiency are low, and a rise in the resistance can also be seen. Further, deterioration in the cycling characteristics can also be seen.

In Comparative Example 8, as the firing temperature is low, the crystalline of the cathode active material is extremely low. Therefore the tap density is low, and the initial discharging capacity and efficiency are extremely low. Due to extremely low crystalline, the reaction resistance is large, and deterioration in the cycling characteristics can also be seen.

In Comparative Example 9, as the firing temperature is high, sintering and aggregation proceed, and cation mixing occurs. Therefore, the median diameter D50 is large, and the particle size distribution is wide, and as the sphericity is low, the tap density is also extremely low. Further, the initial discharging capacity and efficiency are extremely low and the resistance is extremely high. Further, great deterioration in cycling characteristics can also be seen.

From the results of Examples 1 through 4 and Comparative Examples 1 through 9, advantageous effects that can be obtained by the present invention are clear.

EXPLANATION OF REFERENCE NUMBERS

1 Coin Battery
2 Case
2a Cathode Can
2b Anode Can
2c Gasket
3 Electrode
3a Cathode
3b Anode
3c Separator

The invention claimed is:

1. A nickel manganese containing composite hydroxide represented by a general formula of: $Ni_xMn_yM_z(OH)_2$, where $x+y+z=1$, $0.1 \leq x \leq 0.7$, $0.1 \leq y \leq 0.5$, $0.1 \leq z \leq 0.5$; and M is one or more of element that is selected from among Co, Ti, V, Cr, Zr, Nb, Mo, Hf, Ta, and W,
   the nickel manganese containing composite hydroxide comprising secondary particles formed by an aggregation of primary particles, and
   the secondary particles having a median diameter D50 within a range of 1 μm to 6 μm, an index [(D90−D10)/D50] which indicates a spread of a particle size distribution of less than 0.50, and a Wadell's sphericity within a range of 0.70 to 0.98.

2. A nickel manganese containing composite hydroxide according to claim 1, wherein the secondary particles have a tap density according to JIS2512:2012 of 1.60 g/cm³ or more.

3. A cathode active material for a non-aqueous electrolyte secondary battery represented by a general formula of: $Li_aNi_xMn_yM_zO_2$, where $0.95 \leq a \leq 1.15$, $x+y+z=1$, $0.1 \leq x \leq 0.7$, $0.1 \leq y \leq 0.5$, $0.1 \leq z \leq 0.5$; and M is one or more of element that is selected from among Co, Ti, V, Cr, Zr, Nb, Mo, Hf, Ta, and W, and comprising a layered hexagonal lithium nickel manganese containing composite oxide,
   the composite oxide comprising secondary particles formed by an aggregation of primary particles, and
   the secondary particles having a median diameter D50 within a range of 1 μm to 6 μm, an index of [(D90−D10)/D50] which indicates a spread of a particle size distribution of less than 0.50, and a Wadell's sphericity is within a range of 0.60 to 0.98.

4. A cathode active material for a non-aqueous electrolyte secondary battery according to claim 3, wherein the secondary particles have a tap density according to JIS2512:2012 of 1.89 g/cm³ or more.

5. A non-aqueous electrolyte secondary battery comprising a cathode material, wherein the cathode material comprises the cathode active material for a non-aqueous electrolyte secondary battery of claim 4.

6. A non-aqueous electrolyte secondary battery comprising a cathode material, wherein the cathode material comprises the cathode active material for a non-aqueous electrolyte secondary battery of claim 3.

7. A method for manufacturing the nickel manganese containing composite hydroxide according to claim 1 by a crystallization reaction, the method comprising steps of:
  a nucleation process performed in a non-oxidizing atmosphere having an oxygen concentration of 5% by volume or less by stirring an aqueous solution for nucleation including a quantity of the material solution corresponding to 0.6% to 5.0% of the whole amount of substance of metal element included in the metal compound used for the overall crystallization reaction, while controlling an ammonium ion concentration of the aqueous solution for nucleation within a range of 3 g/L to 25 g/L, a pH of the aqueous solution for nucleation within a range of 12.0 to 14.0 at a solution temperature of 25° C. as a standard, and a stirring power requirement within a range of 6.0 kW/m³ to 30 kW/m³, to generate nuclei, and
  a particle growth process growing the nuclei by supplying the material solution to an aqueous solution for particle growth including the nuclei while controlling an ammonium ion concentration of the aqueous solution for particle growth within a range of 3 g/L to 25g/L and a pH of the aqueous solution for particle growth within a range of 10.5 to 12.0 at a solution temperature of 25° C. as a standard.

8. A method for manufacturing the cathode active material for a non-aqueous electrolyte secondary battery according to claim 3, the method comprising steps of:
  a mixing process to obtain a lithium mixture by mixing a lithium compound to a nickel manganese containing composite hydroxide to have a ratio of a number of lithium atoms against a number of metal element other than lithium within a range of 0.95 to 1.15, and
  a firing process of sintering the lithium mixture in an oxidizing atmosphere within a temperature range of 750° C. to 1000° C.,
  wherein the nickel manganese containing composite hydroxide is represented by a general formula of: $Ni_xMn_yM_z(OH)_2$, where x+y+z=1, 0.1≤x≤0.7, 0.1≤y≤0.5, 0.1≤z≤0.5; and M is one or more of element that is selected from among Co, Ti, V, Cr, Zr, Nb, Mo, Hf, Ta, and W,
  the nickel manganese containing composite hydroxide comprising secondary particles formed by an aggregation of primary particles, and
  the secondary particles having:
    a median diameter D50 within a range of 1μm to 6 μm, an index [(D90-D10)/D50] which indicates a spread of a particle size distribution of less than 0.50, and
    a Wadell's sphericity within a range of 0.70 to 0.98.

9. A method for manufacturing the cathode active material for a non-aqueous electrolyte secondary battery according to claim 3, the method comprising steps of:
  a mixing process to obtain a lithium mixture by mixing a lithium compound to a nickel manganese containing composite hydroxide to have a ratio of a number of lithium atoms against a number of metal element other than lithium within a range of 0.95 to 1.15, and
  a firing process of sintering the lithium mixture in an oxidizing atmosphere within a temperature range of 750° C. to 1000° C.,
  wherein the nickel manganese containing composite hydroxide is represented by a general formula of: $Ni_xMn_yM_z(OH)_2$, where x+y+z=1, 0.1≤x≤0.7, 0.1≤y≤0.5, 0.1≤z≤0.5; and M is one or more of element that is selected from among Co, Ti, V, Cr, Zr, Nb, Mo, Hf, Ta, and W,
  the nickel manganese containing composite hydroxide comprising secondary particles formed by an aggregation of primary particles, and
  the secondary particles having:
    a median diameter D50 within a range of 1 μm to 6 μm, an index [(D90-D10)/ D50] which indicates a spread of a particle size distribution of less than 0.50,
    a Wadell's sphericity within a range of 0.70 to 0.98, and a tap density according to JIS2512:2012 of 1.60 g/cm³ or more.

* * * * *